United States Patent [19]
Broden et al.

[11] Patent Number: 5,157,972
[45] Date of Patent: Oct. 27, 1992

[54] PRESSURE SENSOR WITH HIGH MODULES SUPPORT

[75] Inventors: David A. Broden, Chanhassen; Brian J. Bischoff, Eagan; Bennett L. Louwagie, Plymouth, all of Minn.

[73] Assignee: Rosemount Inc., Eden Prairie, Minn.

[21] Appl. No.: 677,309

[22] Filed: Mar. 29, 1991

[51] Int. Cl.$^5$ ............................. G01L 7/08; G01L 9/12
[52] U.S. Cl. .................................. 73/718; 29/25.41; 73/724; 361/283
[58] Field of Search ............... 73/718, 724, 756, 708, 73/706, 720, 721, 726, 727, DIG. 4; 361/283; 29/25.41, 621.1, 25.42; 92/103 SD

[56] References Cited

U.S. PATENT DOCUMENTS 4,833,920  5/1989  Knecht et al. ........................ 73/717
4,905,575  3/1990  Knecht et al. ........................ 73/718

FOREIGN PATENT DOCUMENTS 0008571  1/1979  Japan ........................ 73/718

Primary Examiner—Donald O. Woodiel
Attorney, Agent, or Firm—Kinney & Lange

[57] ABSTRACT

A metal thin film bonds a semiconductor bonding region of a diaphragm layer to a ceramic bonding region of a high modulus support block. The arrangement isolates a pressure sensing diaphragm from undesired strain, improving sensor accuracy. A passageway through the support block couples the fluid pressure to the sensing diaphragm to deflect it. Capacitive coupling between the diaphragm and a capacitor plate on the support block sense the deflection and provide an output representative of pressure.

30 Claims, 5 Drawing Sheets

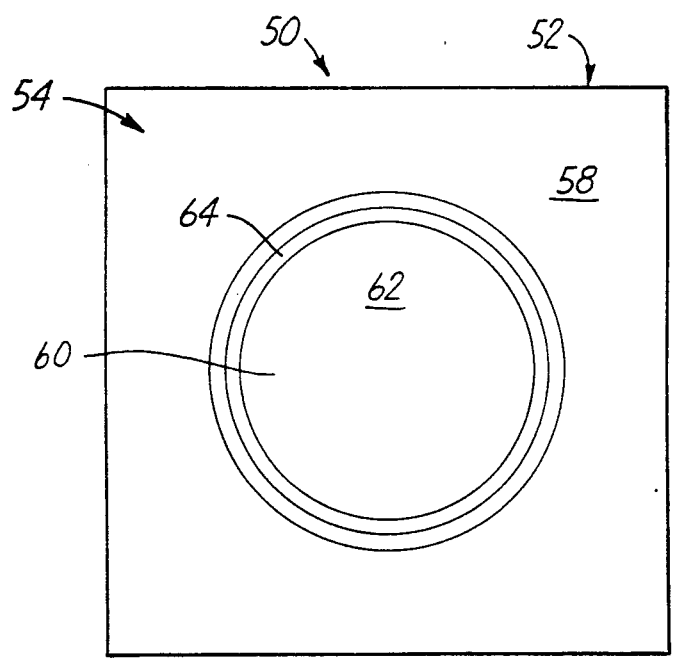
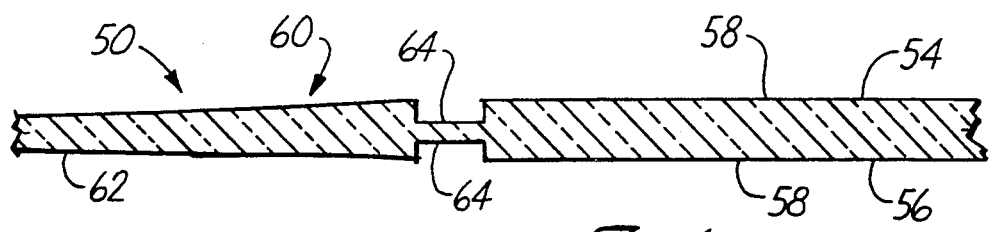

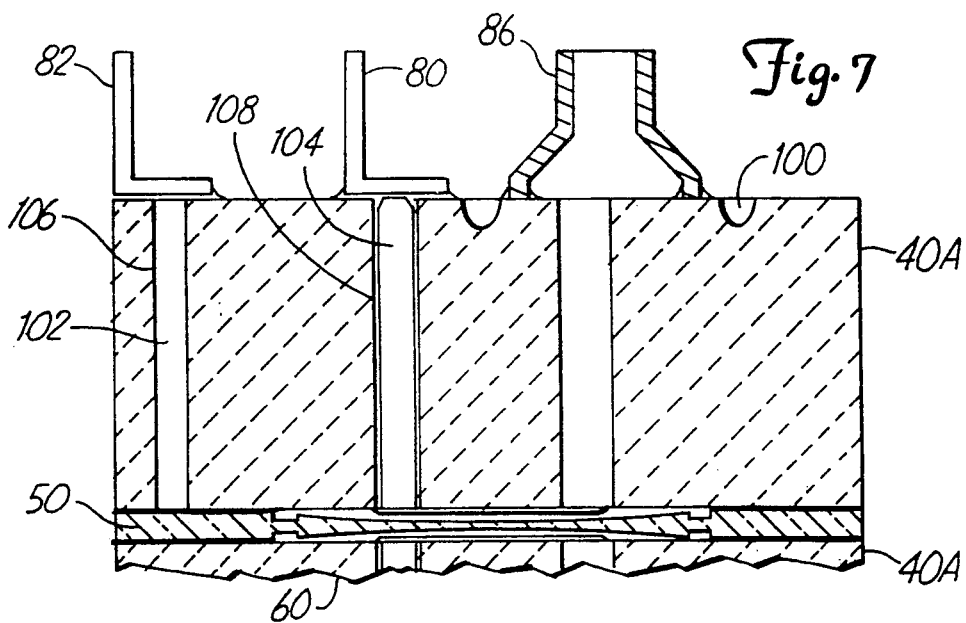
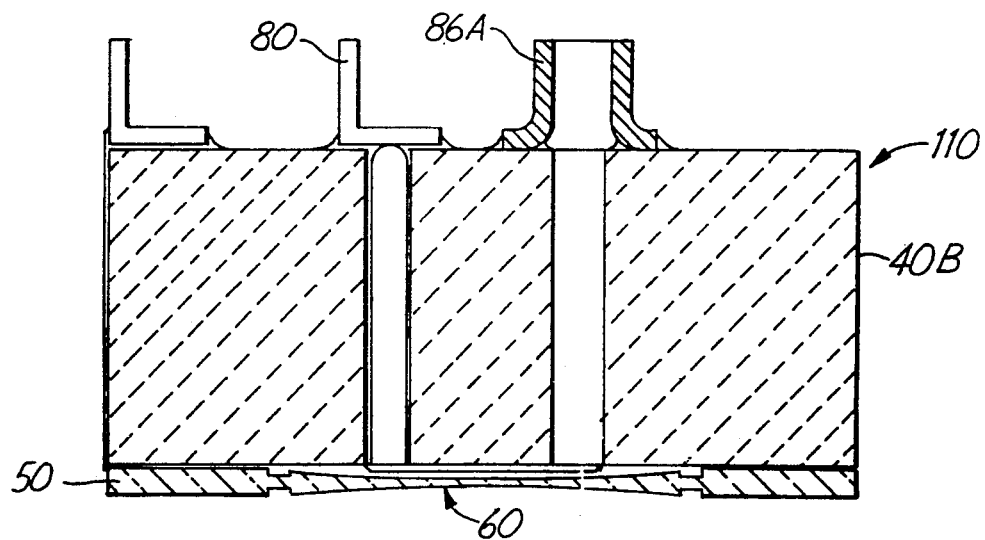

PRESSURE SENSOR WITH HIGH MODULES SUPPORT

BACKGROUND OF THE INVENTION

This invention relates to pressure sensors for sensing fluid pressure.

Batch fabricated differential pressure sensors formed of brittle materials are known, for example, from U.S. Pat. No. 4,833,920 to Knecht et al. (PCT publication number WO 88/00335) which is hereby incorporated by reference. Typically, a sensing diaphragm is formed in a silicon layer that is bonded to glass reference plates which have metal capacitor electrodes deposited on them. The assembly of diaphragm layer and reference layers is then clamped between support cylinders which reduce the tendency of the reference plates to bow when high line pressure is applied. The sensor is connected to electrical circuitry which senses the pressure sensitive capacitances between the capacitor plates and the diaphragm and provides an output representative of the pressure.

Environmental conditions other than a pressure to be sensed can deflect the diaphragm or reference plates undesirably. This undesirable deflection limits the accurate range of such sensors. Mismatches between the temperature coefficients of expansion of the materials used for the diaphragm, reference plates or clamping arrangement can deflect the diaphragm undesirably, or cause stress in the sensor which leads to cracking. Bulging of the reference plates due to line pressure can adversely affect the measurement of a differential pressure. The strength of the bonding and sealing between the diaphragm and the support layer, or between support layer and tubing connections to an isolator can limit the upper range of pressure which can safely be applied to the sensor, or can lead to non-repeatable or hysteresis type errors with changes in temperature, pressures or both.

There is a desire to extend operating ranges of differential and line pressures, temperature, or both, however, limitations in the materials used in the sensor, geometric arrangement and bonding materials continue to limit performance. There is thus a need to provide a pressure sensor which combines materials bonded in a geometry that provides desired accuracy over a selected range of line pressure, differential pressure and temperature.

SUMMARY OF THE INVENTION

In the present invention, a metal thin film bonds a semiconductor bonding region of a diaphragm layer to a ceramic bonding region of a high modulus support block with a temperature coefficient of expansion of the support block matched to that of the diaphragm. The arrangement isolates a pressure sensing diaphragm in the diaphragm layer from undesired strain, improving the accuracy of the sensor.

The diaphragm layer has a layer face bounded by a layer rim. The layer face exposes the semiconductor bonding region surrounding a sensing diaphragm formed in the diaphragm layer. Coupling means couple the fluid pressure to the sensing diaphragm to deflect it. Sensing means couple to the sensing diaphragm for sensing the deflection and provide an output representative of pressure. The support block has first and second block faces bounded by a block rim, the first block face exposes the ceramic bonding region to the facing semiconductor bonding region. The thin film layer is formed of a metal thin film disposed between the facing semiconductor and ceramic bonding regions. The thin film layer bonds the semiconductor bonding region to the ceramic bonding region.

DESCRIPTION OF THE DRAWINGS

FIG. 4 is a front view of a diaphragm layer.

FIG. 6 is partial cross-sectional view of a diaphragm layer with a metallization deposited on it.

FIG. 7 is a partial cross-sectional view of a sensor according to the invention.

FIG. 8 is a cross-sectional view of a sensor according to the invention.

DETAILED DESCRIPTION OF THE PREFERRED EMBODIMENTS

Figure 1:
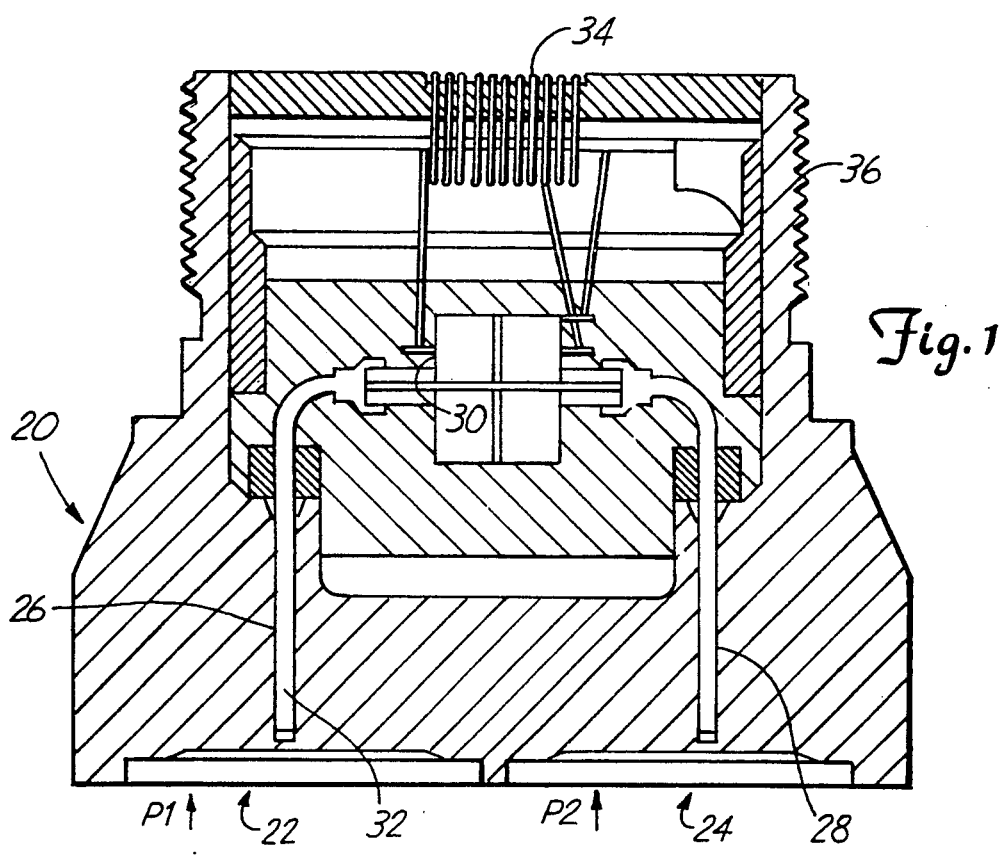
FIG. 1 is a cross-sectional view of a pressure transmitter lower housing including a sensor according to the present invention.

In FIG. 1, lower housing 20 of a pressure transmitter is shown. In lower housing 20, two fluid isolators 22, 24 receive pressures P1 and P2 applied to the transmitter. Passageways 26, 28 in lower housing 20 connect isolators 22, 24 to pressure sensor 30. Incompressible fluid such as silicone oil 32 fills isolators 22, 24 and passageways 26, 28 for coupling pressures to fluid pressure sensor 30. Fluid pressure sensor 30 senses pressure and provides an electrical output indicative of pressure to connector 34. Transmitter circuitry in an upper housing (not shown) which threads on to the lower housing threads 36 receives the electrical output of sensor 30 and converts it to an output which can be transmitted over long distances, such as a 4-20 mA output, or a digital output.

Figure 3:
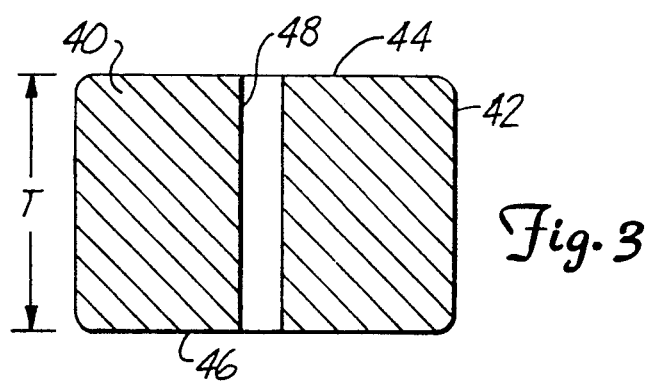
FIG. 3 is a cross-sectional side view of the support block of FIG. 2.
Figure 2:
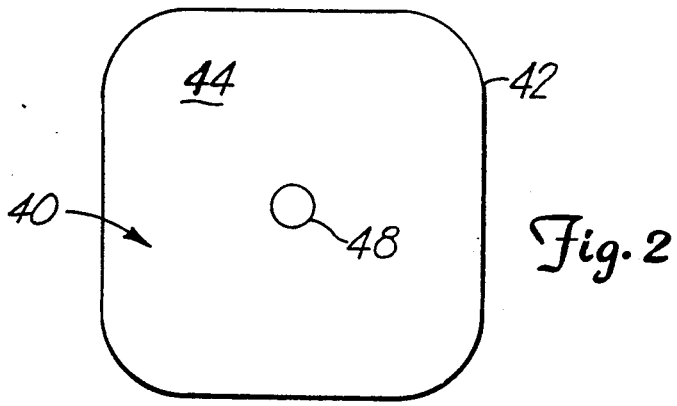
FIG. 2 is a front view of a support block.

In FIGS. 2 and 3, support block 40 is shown having outer rim 42 surrounding flat faces 44, 46 on opposite sides. A central passageway or hole 48 extends between flat faces 44, 46. Support block 40 is bonded to a diaphragm layer 50 (shown in FIG. 4) to support the diaphragm layer. Support block 40 preferably has a thickness "T" in the range of 3.8 mm (0.15 inch) to 10.2 mm (0.40 inch). Thickness "T" of the support block is selected to be about 10-40 times the thickness of the diaphragm layer to which it is bonded, depending on upper pressure limit for the sensor. Thickness "T" is preferably more than 15 times the thickness of the diaphragm layer. Support block 40 is formed of a ceramic material selected to have high stiffness with a modulus of about 45 million pounds per square inch, which is 2.5 times the stiffness of silicon. A preferred high modulus ceramic material for the support structure is "endowed SRBSN", or "SSN", ceramic material supplied by ESK Engineered Ceramics, Wacker Chemicals USA Inc., New Canaan, Conn. This high modulus ceramic material exhibits bulk hermeticity, and is capable of forming hermetic seals to other materials by sealing processes such as frit sealing and active metal brazing. This high modulus ceramic material is also electrically insulating. The electrical insulating properties allow electrically energized portions of a sensor, such as leads and capacitor plates, to closely contact support structure surfaces, without providing additional electrical insulating materials between the support structure and a metal part to which the support structure is mounted. Endowed SRBSN has a temperature coefficient of expansion closely matched to that of silicon. This allows hard, substantially non-flexing mounting of support block 40 to diaphragm layer 50 without added intermediate layers, or resilient materials, to relieve strain between adjacent surfaces of materials of differing temperature coefficients of expansion. The matching expansion characteristics reduce both repeatable and non-repeatable thermal errors over a wide temperature range. Hysteresis in the sensor output due to pressure and temperature changes is greatly reduced. The ceramic material selected effectively combines desirable characteristics in a single block of material and avoids the problem of stacking up multiple layers of differing materials to obtain desired electrical insulating, bonding, temperature coefficient, hermeticity and stiffness properties. The effects of undesired stress from temperature changes, line pressure, differential pressure and mounting are controlled and the construction of the sensor is simplified because the characteristics are combined in a single material.

In FIG. 4, diaphragm layer 50 is shown. Diaphragm layer 50 has a outer rim 52 surrounding layer face 54. A second layer face 56 (not shown in FIG. 4) opposite layer face is similar to layer face 54. A thin film metallization 58 is selectively deposited on a flat surface of layer face 56 between the outer rim 52 and a central diaphragm 60. Diaphragm 60 has a concave face 62 surrounded by an annular groove 64. The outer rim 52 of diaphragm layer 50 is approximately the same size as the outer rim 42 of support block 44, the drawing in FIGS. 4 and FIGS. 2 and 3 having different scales to show detail.

Figure 5:
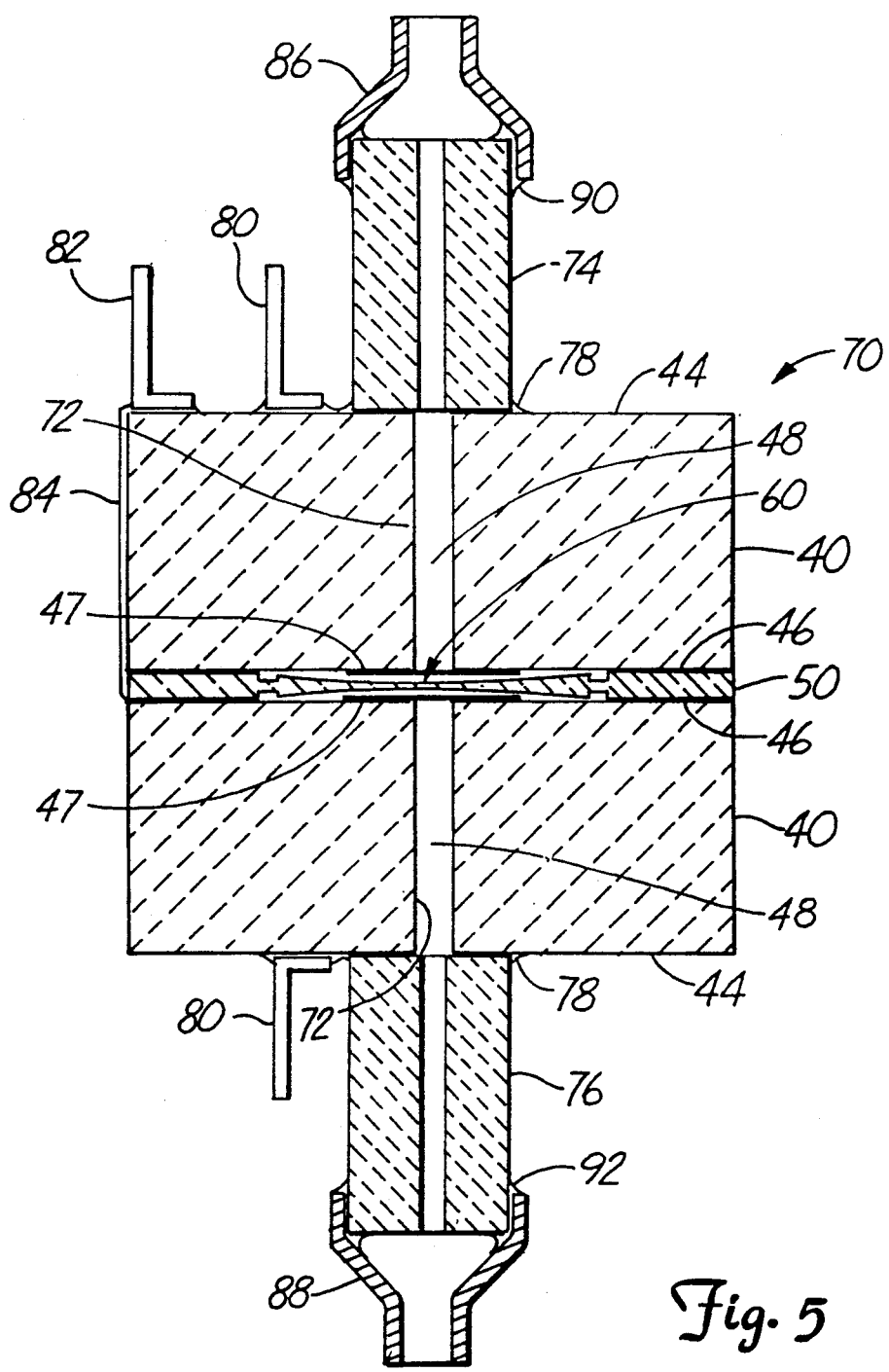
FIG. 5 is a cross-sectional view of a sensor according to the invention.

In FIG. 5, a sensor body 70 is shown formed of a diaphragm layer 50 and two support blocks 40. Circular capacitor plates 47 are formed of metallizations deposited on faces 46 of support blocks 40. The diaphragm layer 50 and support blocks are arranged in contact with one another as shown in FIG. 5 and the assembly is heated to a temperature of about 560°-700° Centigrade. The metallizations 58 have a thickness comparable to the surface roughness of faces 46 of the support blocks. A metallization of about 0.5 to 2.0 microns of aluminum is preferred. Metallizations 58 form a bond at these high temperatures to the faces 46 of the support blocks. The bond has a strength to resist separation of the blocks from the sensor body 70 when the sensor is pressurized and also provides a fluid seal around diaphragm 60. In FIG. 5, central hole 48 in each support block 40 is coated with a metallization 72 to provide an electrically conductive path or sealed feedthrough between faces 44, 46 of each block. Cylindrical extensions 74, 76 are sealingly affixed to support blocks 44 with an active metal braze 78. The active metal braze 78 resists separation forces under pressure, provides a pressure seal and also provides an electrical feedthrough connection from metallization 72 to connector tab 80. Diaphragm 50, which is formed of dopèd silicon semiconductor material is electrically connected to connector tab 82 via metallic track 84.

In FIG. 5, Metal fittings 86, 88 are connected to cylindrical extensions 74, 76 by braze joints 90, 92. The metal fitting 86, 88 connect to passageways 26, 28 in lower transmitter body 20 (FIG. 1) to couple isolator fluid, typically silicone oil, to diaphragm 60. The cylindrical extensions provide electrical insulation between the feedthrough connections for the capacitor plate (i.e. metallizations 72 and braze joints 78) and the metal transmitter body 20. The temperature coefficients of expansion of the metal fittings 86, 88 and cylindrical extensions 74, 76 which are ceramic can be quite poorly matched because the braze joints 90, 92 are placed in compression when the parts shrink after brazing. The arrangement with larger diameter metal extensions 74 bonding around the periphery of a smaller diameter ceramic cylinders 74, 76 avoids excessive tensile forces in the ceramic material.

In FIG. 6, construction of a portion of diaphragm 50 is shown in greater detail. Metallization 58 is selectively deposited on flat peripheral faces. The surface of diaphragm 62 is concave and surrounded by optional grooves 64. Thicknesses of metallization 58 and the capacitor plate 47 can be adjusted to provide the desired spacing between capacitor plate 47 and diaphragm 50.

Figure 9:
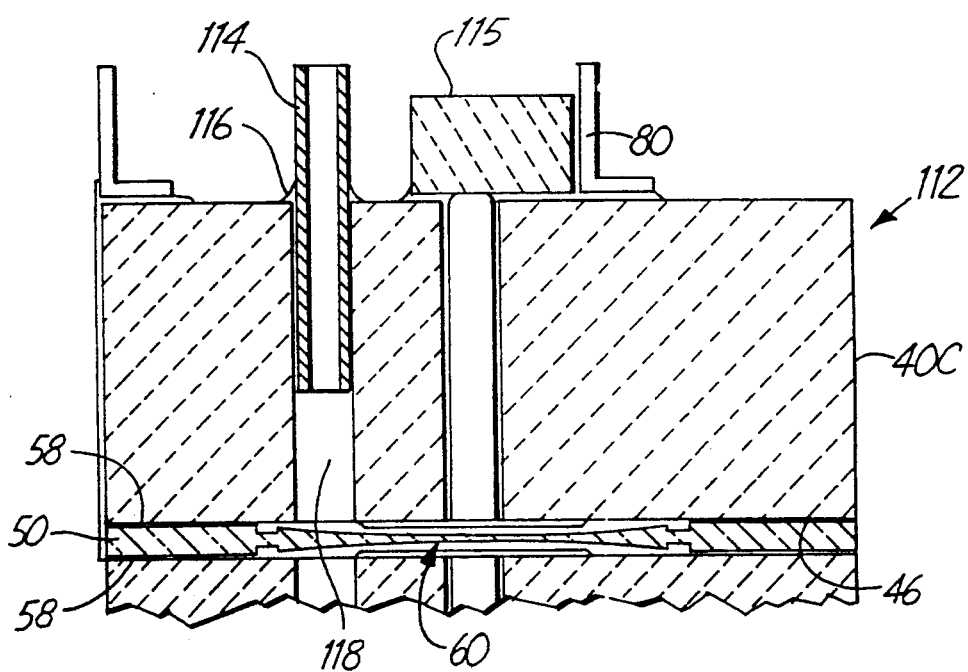
FIG. 9 is a partial cross-sectional view of a sensor according to the invention.

In FIGS. 7, 8, 9, alternate electrical and pressure feedthrough arrangements are shown. In FIG. 7, an annular moat 100 is cut into a support block 40A to provide stress relief between metal coupling 86 brazed to block 40A. Separate feedthrough holes 102, 104 are provided for feedthrough connections for the capacitor plate 47 and diaphragm 50. Metallizations 106, 108 are applied to holes 102, 104 to complete connections electrically. Metal tabs 80, 82 are brazed to support block 40A to seal holes 102, 104.

In FIG. 8, a sensor body 110 is shown which includes only a single support block 40B rather than two support blocks 40A as shown in FIG. 7. Sensor body 110 is a gauge pressure sensor, and has a modified metal fitting 86A brazed to it for connection to an isolator (not shown).

In FIG. 9, a sensor body 112 is shown with a square ceramic block 115 brazed to it to seal off an electrical feedthrough for the associated capacitor plate. In FIG. 9, a tube 114 is connected to a support block 40C by braze joint 116 on the inside diameter of hole 118 to provide fluid from an isolator to the pressure sensing diaphragm.

The variations shown in FIGS. 7, 8, 9 can be applied to a sensor body such as sensor body 70 shown in FIG. 5 to adapt the invention to various applications and processing equipment.

Although the present invention has been described with reference to preferred embodiments, workers skilled in the art will recognize that changes may be made in form and detail without departing from the spirit and scope of the invention.

What is claimed is:

1. A fluid pressure sensor, comprising:
   a diaphragm layer having a layer face bounded by a layer rim, the layer face exposing a semiconductor bonding region surrounding a sensing diaphragm formed in the diaphragm layer;
   means coupling a fluid pressure to the sensing diaphragm to deflect the sensing diaphragm;
   means coupled to the sensing diaphragm for sensing the deflection and providing an output representative of pressure;
   a support block having first and second block faces bounded by a block rim, the first block face exposing a ceramic bonding region facing the semiconductor bonding region; and a thin film layer formed of a metal thin film disposed between the facing semiconductor and ceramic bonding regions, the thin film layer bonding the semiconductor bonding region to the ceramic bonding region.

2. The sensor of claim 1, wherein the support block is formed of a brittle material having a modulus of elasticity substantially higher than the modulus of elasticity of the diaphragm layer.

3. The sensor of claim 2 wherein the means for applying fluid pressure to the diaphragm includes a pressure passageway between the first and second faces of the support block.

4. The sensor of claim 3 wherein the means for sensing deflection include a conductor disposed on the first face of the support block to capacitively couple to the diaphragm.

5. The sensor of claim 4 wherein the means for sensing deflection includes an electrical feedthrough lead connecting to the conductor and passing through the first support block to the second face.

6. The sensor of claim 5 wherein the electrical feedthrough lead passes through the pressure passageway.

7. The sensor of claim 5 wherein the support block further includes a feedthrough passageway extending between the first and second faces thereof, the electrical feedthrough lead passing through the feedthrough passageway.

8. The sensor of claim 5 wherein the means for coupling pressure further comprises an isolator filled with isolator fluid and including an isolator diaphragm and a metal tube coupling isolator fluid from the isolator diaphragm to the sensing diaphragm.

9. The sensor of claim 8 further comprising a ceramic tube sealingly coupling pressure from the metal tube to the pressure passageway, the ceramic tube providing stress isolation.

10. The sensor of claim 9 wherein the ceramic tube electrically isolates the metal tube from the electrical feedthrough means.

11. The sensor of claim 8 wherein an annular groove in cut into the second face of the first ceramic block to provide stress isolation.

12. The sensor of claim 8 wherein the metal tube is brazed into the pressure passageway.

13. The sensor of claim 8 wherein the support block are formed of a ceramic material having a temperature coefficient of expansion substantially matched to the temperature coefficient of expansion of the diaphragm layer.

14. The sensor of claim 8 wherein the support block has a thickness between its first and second faces that is at least 15 times the thickness of the diaphragm layer.

15. The sensor of claim 14 wherein the support block has a thickness between its first and second faces that is at least 15 to 40 times the thickness of the diaphragm layer.

16. A fluid pressure sensor, comprising:
a diaphragm layer having a layer face bounded by a layer rim, the layer face exposing a semiconductor bonding region surrounding a sensing diaphragm formed in the diaphragm layer;
means coupling a fluid pressure to the sensing diaphragm to deflect the sensing diaphragm;
means coupled to the sensing diaphragm for sensing the deflection and providing an output representative of pressure;
a thin film layer formed of a metal thin film bonded to the semiconductor bonding region; and
a support block having first and second block faces bounded by a block rim, the first block face exposing a ceramic bonding region bonded to the semiconductor bonding region.

17. The sensor of claim 16, wherein the support block is formed of an electrically insulating, sintered material having a modulus of elasticity substantially higher than the modulus of elasticity of the diaphragm layer.

18. The sensor of claim 17 wherein the means for applying fluid pressure to the diaphragm includes a pressure passageway between the first and second faces of the support block.

19. The sensor of claim 18 wherein the means for sensing deflection include a conductor disposed on the first face of the support block to capacitively couple to the diaphragm.

20. The sensor of claim 19 wherein the means for sensing deflection includes an electrical feedthrough lead connecting to the conductor and passing through the first support block to the second face.

21. The sensor of claim 20 wherein the electrical feedthrough lead passes through the pressure passageway.

22. The sensor of claim 20 wherein the support block further includes a feedthrough passageway extending between the first and second faces thereof, the electrical feedthrough lead passing through the feedthrough passageway.

23. The sensor of claim 20 wherein the means for coupling pressure further comprises an isolator filled with isolator fluid and including an isolator diaphragm and a metal tube coupling isolator fluid from the isolator diaphragm to the sensing diaphragm.

24. The sensor of claim 23 further comprising a ceramic tube sealingly coupling pressure from the metal tube to the pressure passageway, the ceramic tube providing stress isolation.

25. The sensor of claim 24 wherein the ceramic tube electrically isolates the metal tube from the electrical feedthrough means.

26. The sensor of claim 23 wherein an annular groove in cut into the second face of the first ceramic block to provide stress isolation.

27. The sensor of claim 23 wherein the metal tube is brazed into the pressure passageway.

28. The sensor of claim 23 wherein the support block are formed of a ceramic material having a temperature coefficient of expansion substantially matched to the temperature coefficient of expansion of the diaphragm layer.

29. The sensor of claim 23 wherein the support block has a thickness between its first and second faces that is at least 15 times the thickness of the diaphragm layer.

30. The sensor of claim 29 wherein the support block has a thickness between its first and second faces that is at least 15 to 40 times the thickness of the diaphragm layer.

* * * * *

UNITED STATES PATENT AND TRADEMARK OFFICE
CERTIFICATE OF CORRECTION

PATENT NO. : 5,157,972

DATED : October 27, 1992

INVENTOR(S) : DAVID A. BRODEN, BRIAN J. BISCHOFF, BENNETT L. LOUWAGI

It is certified that error appears in the above-identified patent and that said Letters Patent is hereby corrected as shown below:

On title page, item [54], delete "MODULES", insert "MODULUS"

Col. 1, line 1, delete "MODULES", insert "MODULUS"

Signed and Sealed this

Fifth Day of October, 1993

Attest:

BRUCE LEHMAN

Attesting Officer   Commissioner of Patents and Trademarks